United States Patent
Hansson et al.

(10) Patent No.: US 10,425,566 B2
(45) Date of Patent: Sep. 24, 2019

(54) METHOD FOR CALIBRATING A CAMERA

(71) Applicant: AXIS AB, Lund (SE)

(72) Inventors: Niklas Hansson, Horby (SE); Andreas Palsson, Malmo (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/245,553

(22) Filed: Aug. 24, 2016

(65) Prior Publication Data

US 2016/0364863 A1 Dec. 15, 2016

Related U.S. Application Data

(63) Continuation of application No. 13/828,058, filed on Mar. 14, 2013, now abandoned.
(Continued)

(30) Foreign Application Priority Data

Mar. 29, 2012 (EP) ..................................... 12162107

(51) Int. Cl.
*H04N 5/232* (2006.01)
*H04N 7/18* (2006.01)
(Continued)

(52) U.S. Cl.
CPC ............. *H04N 5/2259* (2013.01); *G06T 7/80* (2017.01); *H04N 5/232* (2013.01); *H04N 5/23293* (2013.01); *H04N 17/002* (2013.01)

(58) Field of Classification Search
CPC ..... G06T 7/0018; G06T 7/80; H04N 5/23293; H04N 5/2259; H04N 17/002; H04N 5/232
(Continued)

(56) References Cited

U.S. PATENT DOCUMENTS 6,121,966 A 9/2000 Tedosio
8,294,560 B2 * 10/2012 Hilger .................... H04N 7/181
340/435
(Continued)

FOREIGN PATENT DOCUMENTS

| CN | 101902564 A | 12/2010 |
|----|-------------|---------|
| EP | 2187622 A1 | 5/2010 |
| WO | 2006017402 A2 | 2/2006 |

OTHER PUBLICATIONS

Zhou et al., "A Master-Slave System to Acquire Biometric Imagery of Humans at Distance," International Multimedia Conference—First ACM SIGMM International Workshop on Video Surveillance, Berkeley, California, Nov. 2-8, 2003 (IWVS '03).

*Primary Examiner* — Susan E. Hodges
(74) *Attorney, Agent, or Firm* — Volpe and Koenig, P.C.

(57) ABSTRACT

A method calibrates a camera having image sensor having a center position. An image view projected onto the image sensor by a lens is captured. At least one image view boundary of the captured image view is detected. A projection center position corresponding to a center of the projected image view is determined in at least one dimension. Offset between the projection center position and a sensor center position is determined, defined in at least one dimension, corresponding to the center of the image sensor capturing the projected image view. The image sensor is moved in relation to the lens based on the offset in order to arrive at a substantially zero offset in at least one dimension between the center of image sensor and the center of the projected image view.

10 Claims, 13 Drawing Sheets

Related U.S. Application Data

(60) Provisional application No. 61/621,181, filed on Apr. 6, 2012.

(51) Int. Cl.
  *H04N 3/22* (2006.01)
  *G06F 3/048* (2013.01)
  *H04N 5/225* (2006.01)
  *H04N 17/00* (2006.01)
  *G06T 7/80* (2017.01)

(58) Field of Classification Search
  USPC .......................................................... 348/151
  See application file for complete search history.

(56) References Cited

U.S. PATENT DOCUMENTS

| | | | | |
|---|---|---|---|---|
| 8,488,001 B2* | 7/2013 | Mohanty | ................ | H04N 7/181 348/143 |
| 2002/0180759 A1* | 12/2002 | Park | ...................... | G06T 3/0012 345/629 |
| 2006/0197839 A1* | 9/2006 | Senior | .................... | H04N 5/232 348/169 |
| 2006/0203090 A1* | 9/2006 | Wang | ...................... | G06K 9/209 348/143 |
| 2006/0203098 A1 | 9/2006 | Henninger et al. | | |
| 2007/0070190 A1* | 3/2007 | Yin | .................. | G08B 13/19626 348/36 |
| 2008/0060034 A1* | 3/2008 | Egnal | ..................... | G01C 11/02 725/105 |
| 2008/0074507 A1 | 3/2008 | Ohara et al. | | |
| 2008/0094480 A1 | 4/2008 | Swarr et al. | | |
| 2008/0204560 A1 | 8/2008 | Nilsson | | |
| 2008/0291318 A1 | 11/2008 | Artonne et al. | | |
| 2009/0208063 A1 | 8/2009 | Chen et al. | | |
| 2010/0033567 A1 | 2/2010 | Gupta et al. | | |
| 2010/0079602 A1 | 4/2010 | Napper et al. | | |
| 2010/0119221 A1 | 5/2010 | Lundberg | | |
| 2011/0063466 A1 | 3/2011 | Imata et al. | | |
| 2011/0085016 A1* | 4/2011 | Kristiansen | ......... | G06F 3/04883 348/14.03 |
| 2011/0128385 A1* | 6/2011 | Bedros | ................... | H04N 5/232 348/164 |
| 2012/0169842 A1* | 7/2012 | Chuang | ............ | G08B 13/19619 348/39 |
| 2012/0274782 A1* | 11/2012 | Kitaguchi | .......... | G06K 9/00624 348/169 |
| 2013/0010111 A1* | 1/2013 | Laforte | ............ | G08B 13/19645 348/143 |
| 2013/0128050 A1* | 5/2013 | Aghdasi | ................ | H04N 7/181 348/158 |
| 2013/0155290 A1 | 6/2013 | Huang | | |

* cited by examiner

METHOD FOR CALIBRATING A CAMERA

CROSS REFERENCE TO RELATED APPLICATIONS

This application is a continuation of U.S. patent application Ser. No. 13/828,058, filed Mar. 14, 2013, which claims the benefit of U.S. Provisional Application No. 61/621,181, filed Apr. 6, 2012, and European Patent Application No. 12162107.2 filed Mar. 29, 2012, which are incorporated by reference as if fully set forth.

FIELD OF INVENTION

The present invention relates to a method for calibrating a camera and in particular a method for calibrating a pan-tilt enabled camera system in order to account for misalignments in the camera system

BACKGROUND

It is often difficult to move camera heads, e.g. pan and tilt enabled camera heads, with precision to a general position in a range of accessible pan tilt positions. Additional problems with the precision arise when the camera is to provide a view of an interpreted or transformed selection selected in a visual interface.

The precision becomes even worse in a system where you have a camera head acquiring images through a lens, e.g., a wide angle lens, not mounted on the camera head but rather fixedly attached to a support structure of the camera head. Hence in these cases, the precision of the mounting of the lens and the support structure to which it is attached is critical. In addition to the problem of mounting the lens with precision, the camera may be shipped without having the lens or the support structure mounted together with the camera head, and in such case, the precision mounting has to be performed in the field. Accordingly, these types of systems often present problems with precision in positioning.

SUMMARY

A method is described to improve the precision in positioning a camera for acquiring a desired image view.

In particular, according to one aspect, a method for calibrating a camera with an image sensor having a center position includes capturing an image view projected onto the image sensor by a lens, the projected image view having a center, detecting at least one image view boundary of the image view captured by the image sensor. The method further includes determining, in at least one dimension, a projection center position corresponding to the center of the projected image view on the image sensor based on detected boundary, determining offset between the projection center position and a sensor center position, defined in at least one dimension, corresponding to the center of the image sensor capturing the projected image view, and moving the image sensor in relation to the lens based on the offset in order to arrive at a substantially zero offset in at least one dimension between the center of image sensor and the center of the projected image view. By detecting the image view boundary and determining the center of the image view from this detection, the act of determining offset is facilitated. Moreover, this enables capturing of maximum image information in that it enables maximum utilization of the image sensor. Further, by aligning the optical axis and the center of the image sensor pan tilt positioning will be more precise, especially when it comes to converting pixel positions in a displayed view to pan and tilt angles.

In another embodiment, the method further comprises performing an additional capture of the image view projected onto the image sensor at a point in time after the moving of the sensor, detecting at least one image view boundary relating to the latter captured image view projected onto the image sensor, determining, in at least one dimension, an updated projection center position corresponding to the center of the projected image view on the image sensor based on latter detected boundary, determining offset between the updated projection center position and the sensor center position, defined in at least one dimension, corresponding to the center of the image sensor capturing the projected image view, and if the offset is zero or substantially zero, then storing the position of the updated projection center, the position being defined relating to at least one dimension including and including a dimension different from the dimension used for determining offset between the between the updated projection center position and the sensor center position. By checking the image view center once more after the initial moving of the image sensor due to offset between the image sensor center and the image view sensor, it is possible to make a high precision centering of the image view onto the image sensor and/or a less precise and less advanced method for calculating the moving of the image sensor may be required and hence simplifying the process.

According to another embodiment, the image view is projected onto the image sensor through a wide angle lens which is producing a circular image or at least a substantially circular image.

According to a further embodiment, the determining of the position of the center of the projected image view includes calculating parameters defining a circle that are likely to represent the at least one detected edge relating to the projected image view.

In yet another embodiment, the calculating of parameters defining a circle that are likely to represent the at least one detected edge relating to the projected image view is based on a Hough transform.

In one embodiment, the camera comprises a pan and tilt enabled camera head including the image sensor, wherein the image view is projected onto the image sensor through a lens fixedly arranged in relation to a base of the camera, and wherein the moving of the image sensor includes moving of the camera head. Thereby enabling a relatively simple design of the camera and in particular the camera head as the sensor movements may be accomplished by moving the entire camera head using pan tilt functionality of the camera.

In a further embodiment, the moving of the camera head is performed as pan and/or tilt movements calculated from the offset between the center of projected image view and center of the image sensor capturing the projected image view.

According to another aspect, a method for calibrating a camera comprises a) the steps of the method described above, b) selecting a position in an overview image view captured by the camera and presented to the operator, c) calculating a pan angle and a tilt angle corresponding to the selected position, d) moving the camera head to a position in which it may capture a detailed image view, not through the wide angle lens, having a center representing the calculated pan angle and tilt angle, e) adjusting the camera head, after the camera head has moved to the position, until the position selected in the overview image is centered in the detailed view, e) saving data representing the amount of adjustment used in for centering the position in detailed view, repeating the steps a-f until a predetermined amount of data relating to the adjustment has been saved, and estimating an error function based on the saved data. By sampling the error in transforming a selection in an overview image view to pan and tilt angles, the precision of the transformation and the resulting transition from overview to detailed view may be increased. The estimation of an error function from the error samples may then allow for a less cumbersome process of getting enough error values in that the number of required error values will decrease without resulting in substantially less precision.

According to one embodiment, the act of estimating an error function includes determining coefficients of a polynomial error function using Linear Least Square Estimation.

According to yet another aspect, a method for transforming a selected position in an overview image captured by a camera to a pan and tilt angle for a camera that are to capture a more detailed view of the selected position comprises calculating the pan and tilt angle for the selected position based on the selected position in the overview image, and compensating the resulting pan tilt angle based on an error function achieved by means of the process described above. In this way, the precision of the transformation may be increased.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures, like reference characters designate like or corresponding parts throughout the several figures.

DETAILED DESCRIPTION OF THE PREFERRED EMBODIMENTS

Figure 1:
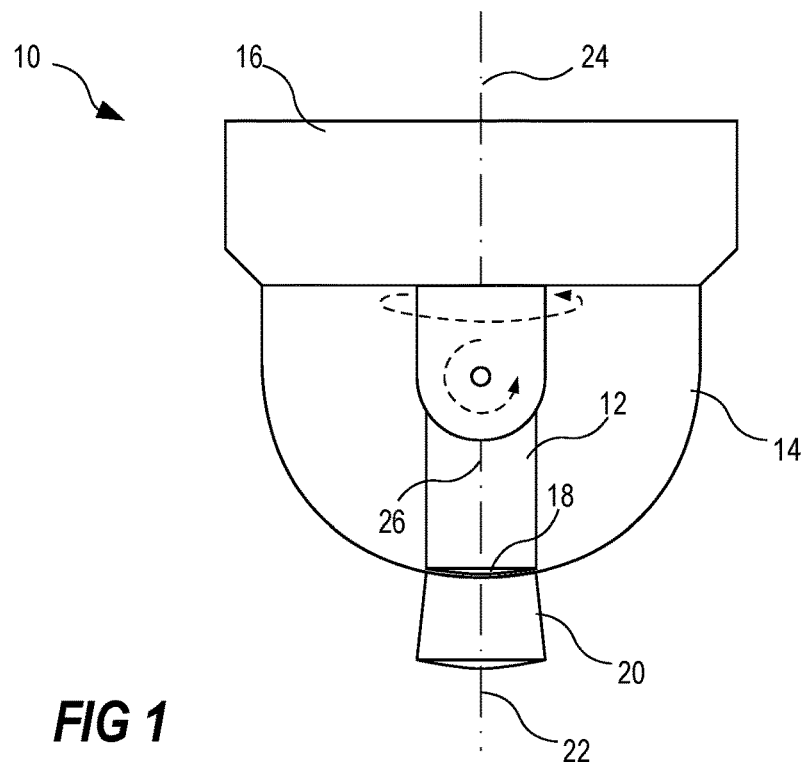
FIG. 1 is a schematic side view of a monitoring camera implementing one embodiment of the invention.

The present invention relates to calibration of the positioning of a camera head in a monitoring camera. Referring to FIG. 1, according to one embodiment the monitoring camera 10 is a dome camera including a camera head 12, a transparent dome cover 14, and a dome base 16. The camera head 12 is enabled to pan and tilt by means of electronically controlled motors, not shown. The camera head 12 may be any known camera head that is enabled to pan and tilt. Further, the camera head 12 includes a lens 18. The lens 18 is arranged to focus light representing a scene to be captured by the camera 10 onto an image sensor in the camera head 12. The viewing angle of the captured image may be fixed or variable. Variable viewing angle may be accomplished by having a zoom enabled lens 18. In case of a fixed viewing angle lens, the selection of the viewing angle may differ between different applications of the camera.

The dome camera further comprises a wide angle lens 20 mounted on the transparent dome cover 14 and extending from the dome cover 14 and away from the camera head 12.

The wide angle lens 20 is mounted in a direction making the optical axis 22 of the wide angle lens substantially coincide with a rotational axis 24 around which the camera head 12 is turned during panning, hereinafter referred to as panning axis 24. The viewing angle of the wide angle lens 20 is wider than the viewing angle of the lens 18 in the camera head 12. In one embodiment, the viewing angle of the wide angle lens 20 is substantially wider than the viewing angle of the lens 18 of the camera head 12. The viewing angle of the wide angle lens may be more than 180 degrees. However, depending on the application, the viewing angle may be less or more. The angle should at least be selected to provide a reasonable overview image.

Accordingly, the wide angle lens 20 is mounted so that the optical axis 26 of the camera head 12 is aligned with the optical axis 22 of the wide angle lens 20 when the camera head 12 is directed for capturing an image through the wide angle lens 20.

Figure 2:
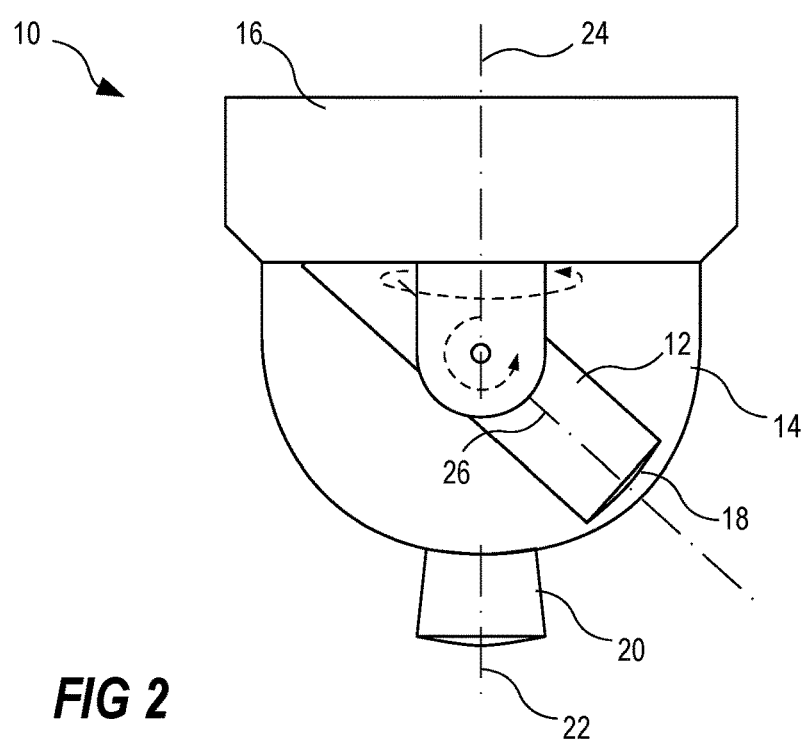
FIG. 2 is the same side view as in FIG. 1 with the difference that the camera head of the monitoring camera is tilted.

Due to the positioning of the wide angle lens 20 and the fact that the camera head 12 is moveable, it is possible to capture overview images through the wide angle lens 20 as depicted in FIG. 1 and when something interesting is spotted or detected in the overview image, it is possible to investigate in more detail by simply moving the camera head 12 away from the wide angle lens 20 and directing it towards the interesting event or feature and capturing images through the dome cover. In FIG. 2, the camera is shown in a position for capturing the images through the dome cover in order to get a more detailed view and not through the wide angle lens 20.

In one embodiment, the viewing angle or the focal length of the lens 18 of the camera head 12 may be selected so that the images captured by the camera head 12, when not captured through the wide angle lens 20, are adequate for providing relevant surveillance information. Examples of relevant surveillance information may for instance be the registration number of a car, an identifiable face of a person, detailed progress of an event, etc. The viewing angle of the wide angle lens 20 may be selected so that the camera head 12 may capture an image view of at least the floor of an entire room in which the monitoring camera is installed when directed to capture images through the wide angle lens 20.

Alternatively, the viewing angle of the wide angle lens 20 is selected so that the camera head 12 will capture an overview image of the monitored area when the camera head 12 is directed to capture images through the wide angle lens 20. Then an operator or an image analysis process may identify events or features of interest in the overview and redirect the camera head 12 for direct capture of the scene including the event or feature of interest. "Direct capture" in the above sentence should be understood as capturing an image by means of the camera head 12 when not directed to capture images through the wide angle lens 20.

Figure 3:
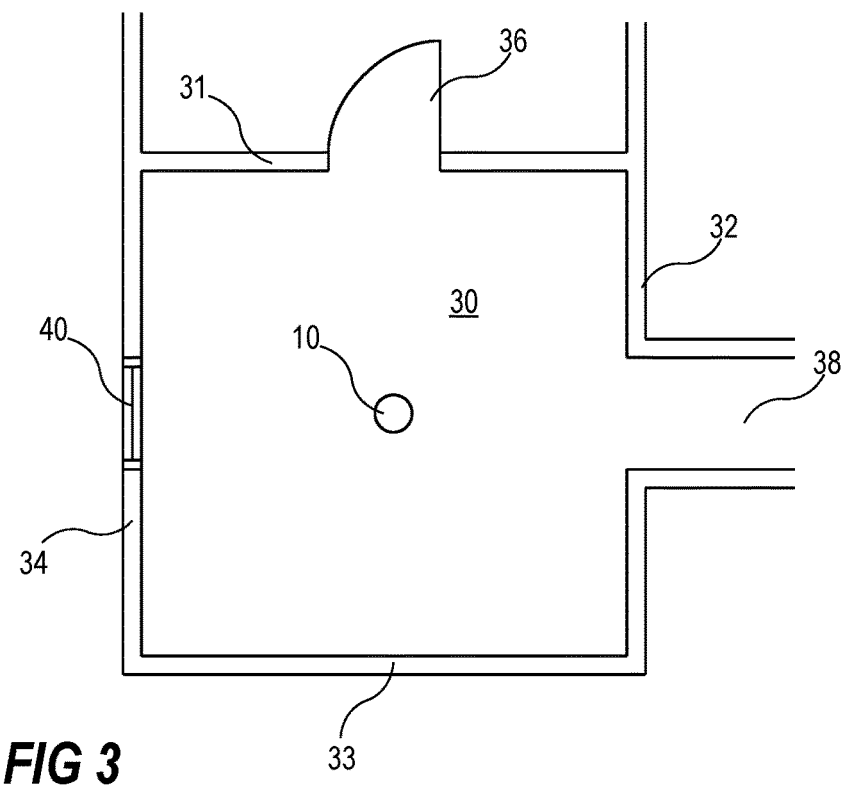
FIG. 3 is a schematic overview of an example room in which a monitoring camera according to one embodiment of the invention is fictionally installed.
Figure 4:
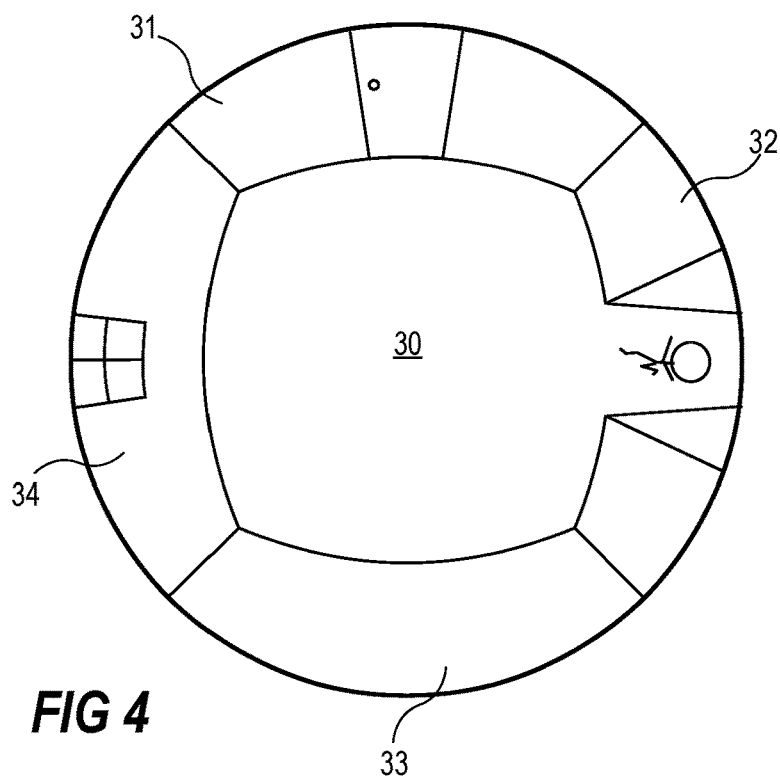
FIG. 4 is an example overview image from the monitoring camera in the example room of FIG. 3 capturing images through a wide angle lens as in FIG. 1.
Figure 5:
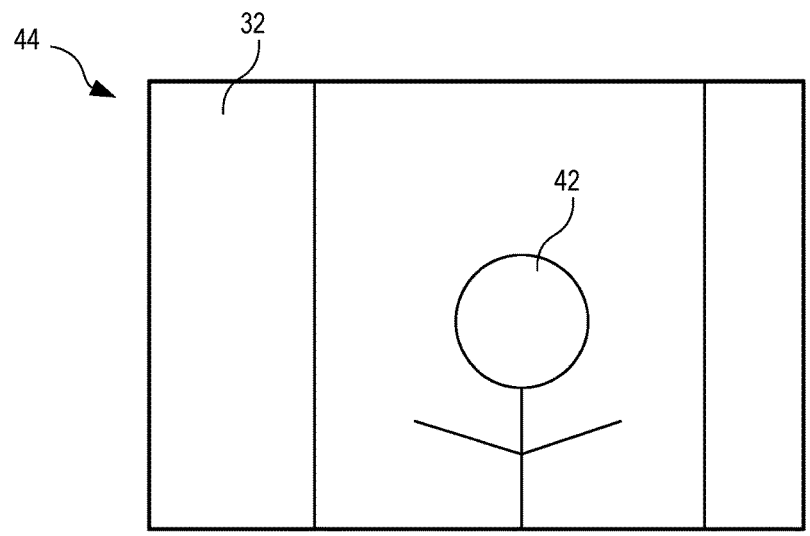
FIG. 5 is an example of a detailed view from the monitoring camera in example room of FIG. 3 capturing images through the dome glass as depicted in FIG. 2.

In order to facilitate the understanding of the function of the camera, an example scenario will be described below. In this example scenario, a monitoring camera 10 according to one embodiment of the invention is installed in the ceiling of a room 30, see FIG. 3. The room includes four walls 31-34, wherein wall 31 holds a door 36 for passage to an area next to the room, wall 32 presents a passage into a corridor 38, and wall 34 holds a window 40. It is assumed that the monitoring camera 10 is set in an overview mode, i.e., the camera head is capturing an overview image of the monitored area by capturing images through the wide angle lens, the setting of the camera that is shown in FIG. 1. A frame from a video sequence from the monitoring camera 10 in overview mode may look like the image in FIG. 4 in which all four walls 31-34 of the monitored room 30 is captured by the overview camera view, i.e., the entire room 30 is captured by the monitoring camera when in overview mode. Moreover, the image frame reveals that a person 42 is entering the room. This is probably even more evident from a video sequence including the image frame. If an operator having access to the imagery of this monitoring camera 10, and having authority to control the monitoring camera 10, finds this person 42 interesting and would like to get a more detailed image of the person 42, then the operator may simply indicate the person 42 or the area of the person in the overview image at a control station and the camera head of the monitoring camera is directed away from the wide angle lens 20 and towards the indicated area of the monitored room 30. The directing of the camera head 12 away from the wide angle lens 20 may alternatively be initiated in response to a detected motion in the overview image, detected by means of a motion detection process. Hence, the camera head 12 may be moved into a position similar to the position shown in FIG. 2, and may capture an image 44 as the one presented in FIG. 5. The image captured by the camera head 12 may have a wider or narrower image view depending on the lens 18 on the camera head 12 and/or the zoom setting of this lens 18. Then, when the operator has finished studying the person, the camera head 12 may be returned to capture images through the wide angle lens 20 and thereby be returned to the overview mode of the monitoring camera. Alternatively, if the directing of the camera head 12 away from the wide angle lens 20 was performed in response to motion detection in the overview image, then the camera head 12 may return to capturing images through the wide angle lens 20 in response to no motion being detected in the detailed view.

Figure 6:
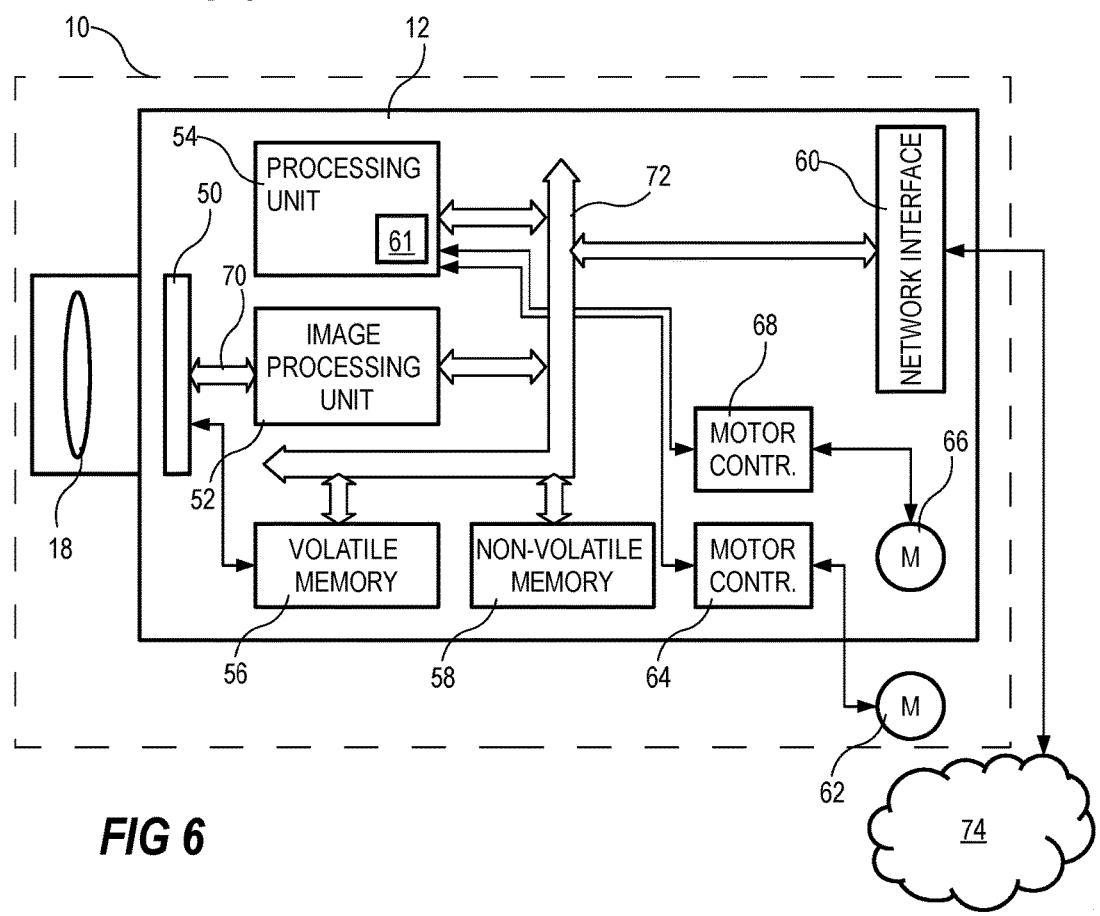
FIG. 6 is a schematic block diagram of a camera head according to one embodiment of the invention.

According to one embodiment, see FIG. 6, the monitoring camera 10 includes an image sensor 50, an image processing unit 52, a general processing unit 54, a volatile memory 56, a non-volatile memory 58, a network interface 60, a camera position controller 61, a panning motor 62, a panning motor controller 64, a tilting motor 66, and a tilting motor controller 68. Further means and devices required in a camera in order to perform normal camera functionality and normal network activities are not described herein as these means and devices are well known to the person skilled in the art.

The image sensor 50 may be any known image sensor able to capture light representing an image view and convert the light to electrical signals, which then may be processed into digital images and or digital image streams by the image processing unit 52. Thus, the image sensor 50 may be arranged to capture visible light or infrared light, depending on the application of the camera. The image data from the image sensor 50 is sent to the image processing unit 52 via connection 70. The image processing unit 52 and the general processing unit 54 may be the same device, may be implemented as separate units on the same chip, or may be separate devices. Moreover, many functions described below as being performed in the image processing unit 52 may be performed in the general processing unit 54 and vice versa.

The processing units 52, 54 are connected to the volatile memory 56 for use as a work memory via for instance a bus 72. Moreover, the volatile memory 56 may be used as temporary data storage for image data during processing of the image data and the volatile memory 56 may therefore be connected to the image sensor 50 as well. The non-volatile memory 58 may store program code required for the processing units 52, 54 to operate and may store settings and parameters that are to be preserved for a longer time period and even withstand power outages. The processing units 52, 54 are connected to the non-volatile memory 58 via, for instance, the bus 72.

The network interface 60 includes an electrical interface to the network 74, which the monitoring camera is to be connected to. Further, the network interface 60 also includes all logic interface parts that are not implemented as being executed by the processing unit 54. The network 74 may be any known type of LAN (Local Area Network), WAN (Wide Area Network), or the Internet. The person skilled in the art is well aware of how to implement a network interface using any of a plurality of known implementations and protocols.

The panning motor 62 and the tilting motor 66 are controlled by the processing 54 unit via each motor controller 64, 68. The motor controllers are arranged to convert instructions from the camera position controller 61 into electrical signals compatible with the motors. The camera position controller 61 may be implemented by means of code stored in memory 58 or by logical circuitry. The tilt motor 66 may be arranged within or very close to a panable/tiltable camera head 12 and the pan motor 62 are in many cases arranged further away from the camera head 12, in particular in the cases where the joint for panning is the second joint, counted from the camera head 12. Control messages for pan and tilt may be received via the network 74 and processed by the processing unit 54 before forwarded to the motor controllers 64, 68.

Other implementations of the monitoring camera 10 are evident to the person skilled in the art.

The above described function of redirecting the camera head from capturing overview images to capturing detailed images of positions indicated in an image captured in overview mode may be implemented by transforming the coordinates of the indicated position within the overview image to pan and tilt angles for positioning the camera in detailed mode to capture an image of the indicated position.

Figure 7A:
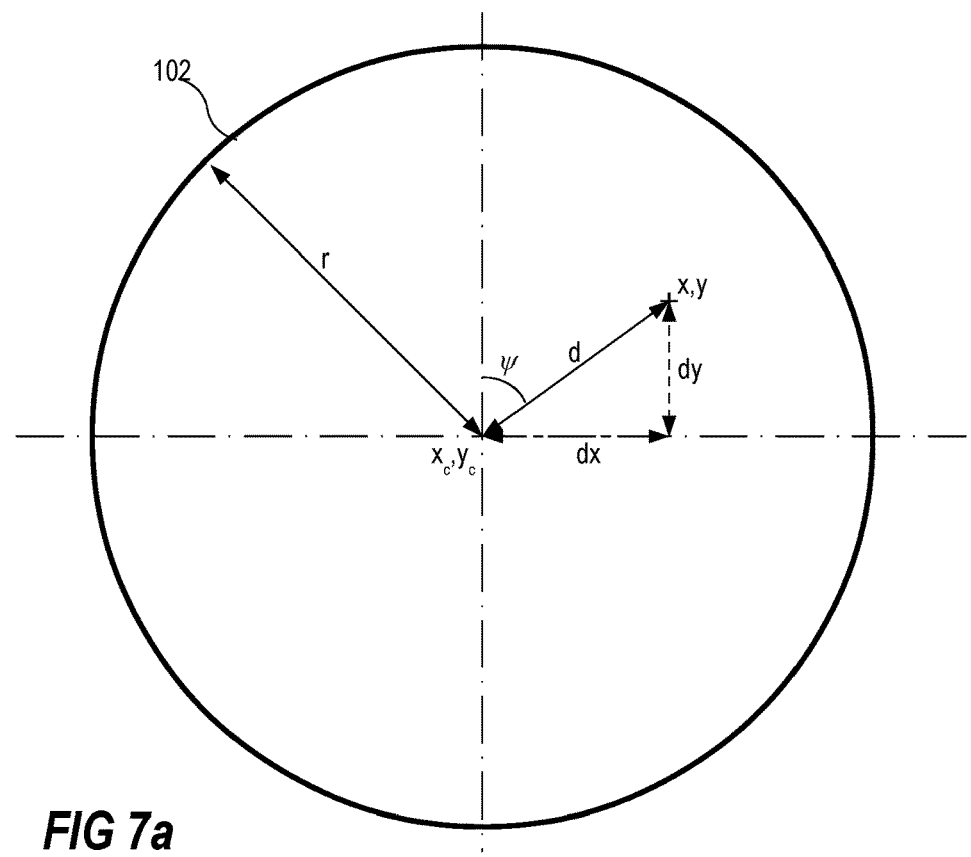
FIGS. 7a-b show diagrams of the relations between the camera head, positions in overview image, and pan-tilt angles for the camera head.
Figure 7B:
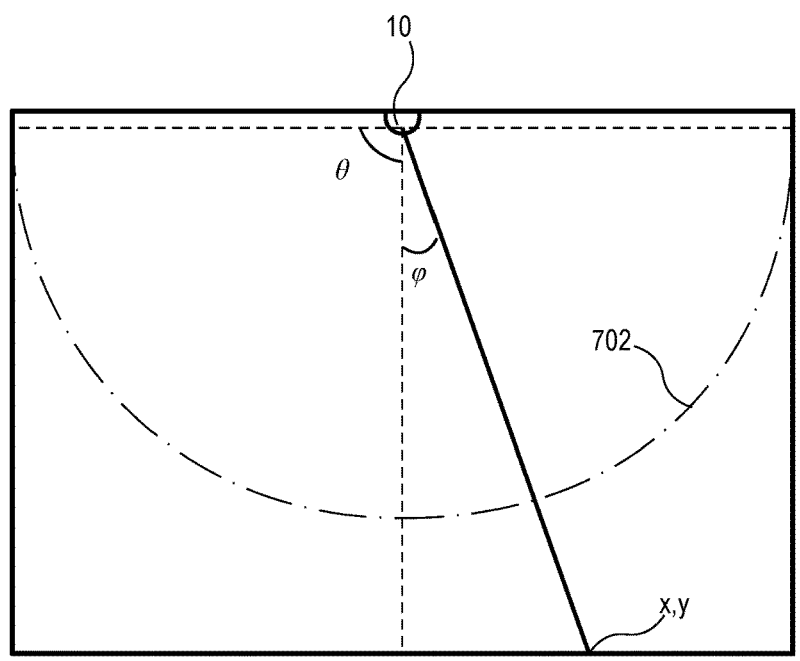

Now referring to FIGS. 7a and 7b, the pan angle, $\Psi$, and the tilt angle, $\varphi$, may be calculated from the coordinates x, y, in the overview image, schematically depicted in FIG. 7a, using the equations below. Distances dx and dy, respectively, are the distances from the center, $(x_c, y_c)$, of the overview image to an indicated position, x, y within the boundary 102 of the overview image. Moreover, referring to FIG. 7b, showing a side view of a site having monitoring camera 10 mounted in the ceiling, the total view angle, $\theta$, captured by the wide angle lens is a parameter used for approximating the tilt angle requested from indication of a point in the overview. The relations between these angles and coordinates are also shown in FIGS. 7a and 7b.

$$d = \sqrt{dx^2 + dy^2} \quad \text{Equation 1}$$

$$\varphi = \frac{d}{r}\theta \quad \text{Equation 2}$$

$$\psi \arctan\left(\frac{dx}{dy}\right) \quad \text{Equation 3}$$

Using the above equations, the pan angle $\psi$ is simply calculated by applying trigonometry to the Cartesian coordinates, see Equation 3. The tilt angle $\varphi$, according to this specific embodiment, is an approximation in which the calculation approximates the features of the image captured as being positioned on a spherical surface 702, thus arriving at the Equation 2, in which the tilt angle $\varphi$ is calculated by applying the distance ratio of the distance d and the distance r to the total view angle $\theta$. This embodiment is not necessarily limited to this transformation scheme, but any like transformation scheme may be used.

Figure 8A:
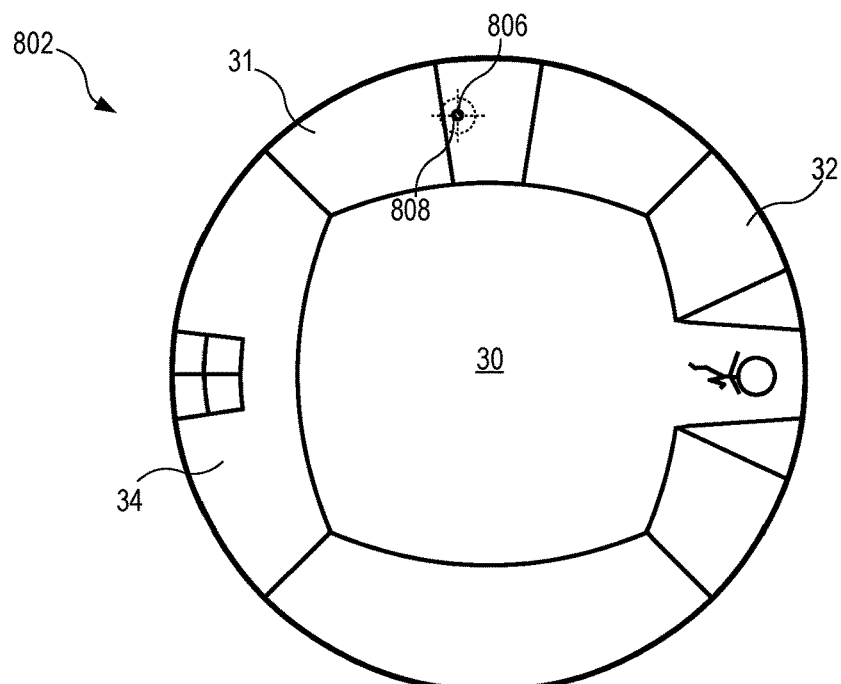
FIG. 8a shows an overview image and a selected position in the overview image.
Figure 8B:
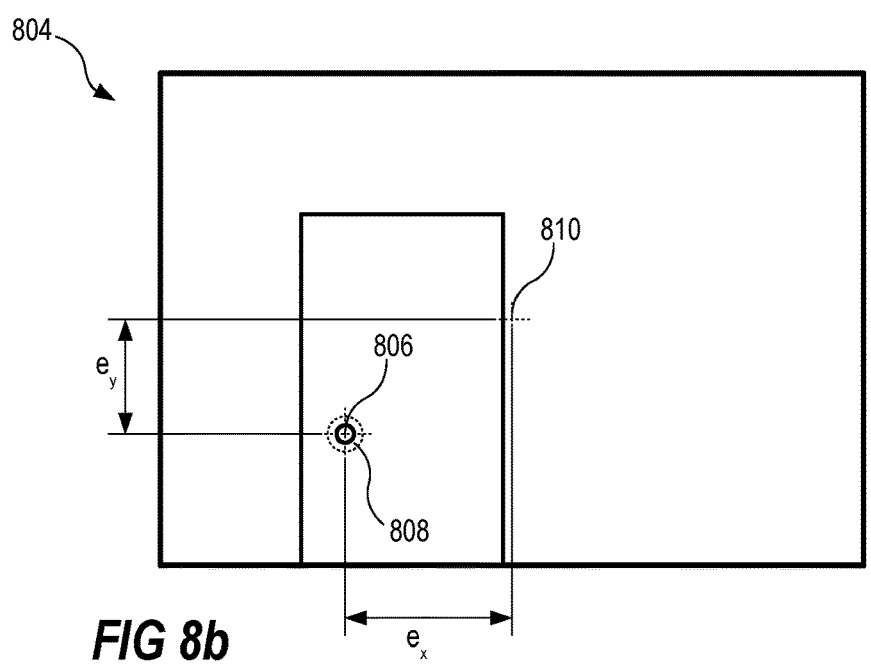
FIG. 8b shows a possible detailed view resulting from the camera transitioning from the overview mode to a detailed view of the selected position.

Depending on the application of the camera, the level of precision required of the transformation may vary. However, even in applications not requiring very high precision, a user will expect the point selected in the overview to appear quite close to the center of the image in the detailed view. The resulting transformation from a system offering less quality transformations is illustrated in FIGS. 8a-b in which an overview image 802 and an detailed image 804 resulting from the selection of a point 806 in the overview image is shown. For instance, it may be assumed that the user selects the position 806 in the overview image depicting the features of a doorknob 808. The camera then changes mode into the detailed mode and redirects the camera for capturing an image or video having the selected point 808 in the center 810 of the frame. However, in this example, the transformation of positions between the two modes is not particularly precise resulting in an offset of $e_x$ and $e_y$. An offset from requested positions, as described in the above example, is worth adjusting for a couple of reasons. Examples of such reasons are that the offset is annoying for the user, the offset may result in a missed opportunity of identifying a person who only is visible for a short amount of time, the offset may be troublesome in applications requiring masking, etc. In the example of applications requiring masking, e.g. of areas, objects, or persons, a high degree of precision is required in order not to mask a large portion outside the intended area, object or person and thereby blocking view of more information than requested.

Figure 9:
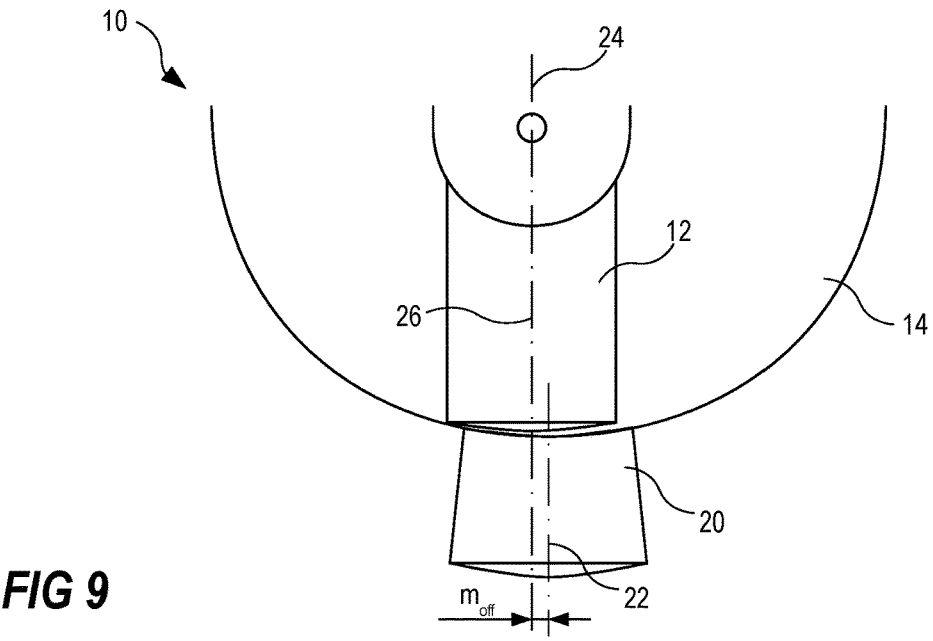
FIG. 9 shows a schematic diagram of a camera in which the camera head and the wide angle lens is not aligned properly.

The offset, $e_x$ and $e_y$, may result from the act of mounting the wide angle lens 20 on the dome 14, the mounting of the dome 14 on the dome base 16, the mounting of the camera head 12 in the housing, etc. The camera assembly 10 requires tight mechanical tolerances in order not to introduce offset problems. For example, offset problems may occur if a mounting screw for any one of the dome, the camera, the wide angle lens, etc. is over tightened a bit too much. Hence one common problem is that the optical axis 22 of the wide angle lens 20 and the optical axis 26 of the camera head 12 is offset, $m_{off}$, when the camera head is arranged having its optical axis 26 coinciding with the rotational axis 24 for panning the camera head, see FIG. 9. The position in which the optical axis 26 of the camera head 12 is arranged to coincide with the rotational axis 24 of the camera head 12 is default position for capturing images through the wide angle lens 20 by means of the camera head 12. However, as evident from FIG. 9, a slight offset of the wide angle lens may result in problems. This type of misalignment may also result in other problems than the problem of offset in between positions in an overview image and corresponding positions in a detailed view. Another problem may be for instance that the image sensor is not effectively utilized in view of useable pixels captured.

Figure 10A:
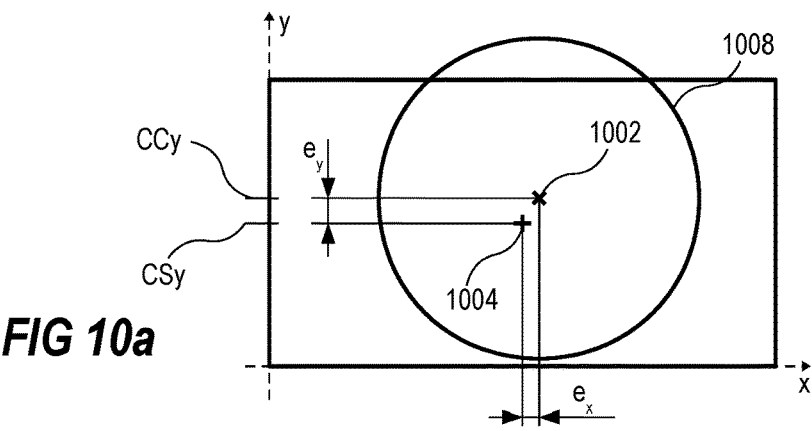
FIG. 10a shows an overview image projected to the image sensor in a camera where the camera head and the wide angle lens is not properly aligned.

One example of the image sensor not being effectively utilized is depicted in FIG. 10a, where the image view projected onto the image sensor via the wide angle lens and the optics of the camera head is not centered on to the image sensor, indicated by distances $e_x$ and $e_y$ indicating the distance between the center point 1002 of the projected image view 1008 and the center point 1004 of the image sensor.

Figure 10B:
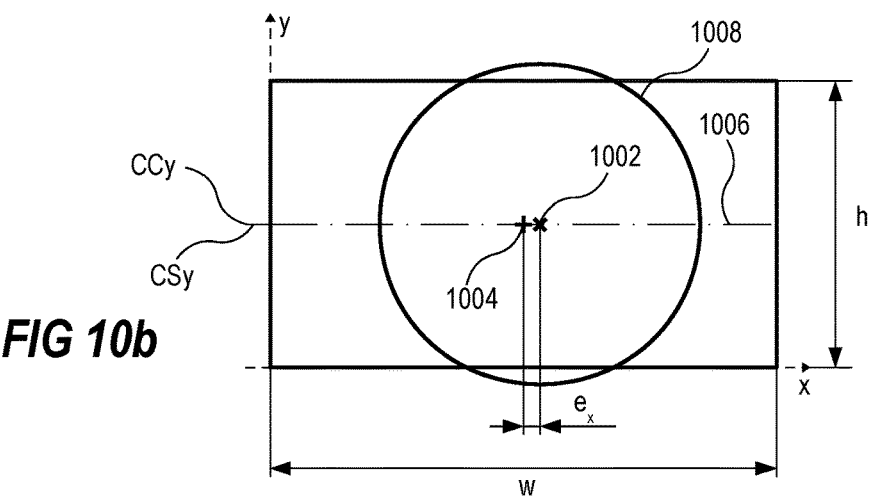
FIG. 10b shows the overview image projected on the image sensor after the camera head and the wide angle lens has been aligned according to one embodiment of the invention.

According to one embodiment, the problem of the image sensor not being effectively utilized is addressed by calibrating the camera system. The calibration in this embodiment includes the act of tilting the camera head 12 and moving the center point 1002 of the projected image view 1008 to a position on an imaginary center-line 1006, dividing the image sensor in two halves, see FIG. 10*b*. In this embodiment, the projected image view 1008 is substantially circular due to the use of a wide angle lens that produces a circular image. The image sensor of this embodiment is rectangular having a greater width, w, than height, h, and being wider than the diameter of the resulting projected circular image. Therefore, the positioning of the projected image view 1008 in the direction of the width of the image sensor, i.e., along the x-axis, is not as critical as the positioning in the direction of the height of the image sensor. One way of implementing this calibration feature is described below referring to FIGS. 10*a*, 10*b*, and 11.

Figure 11:
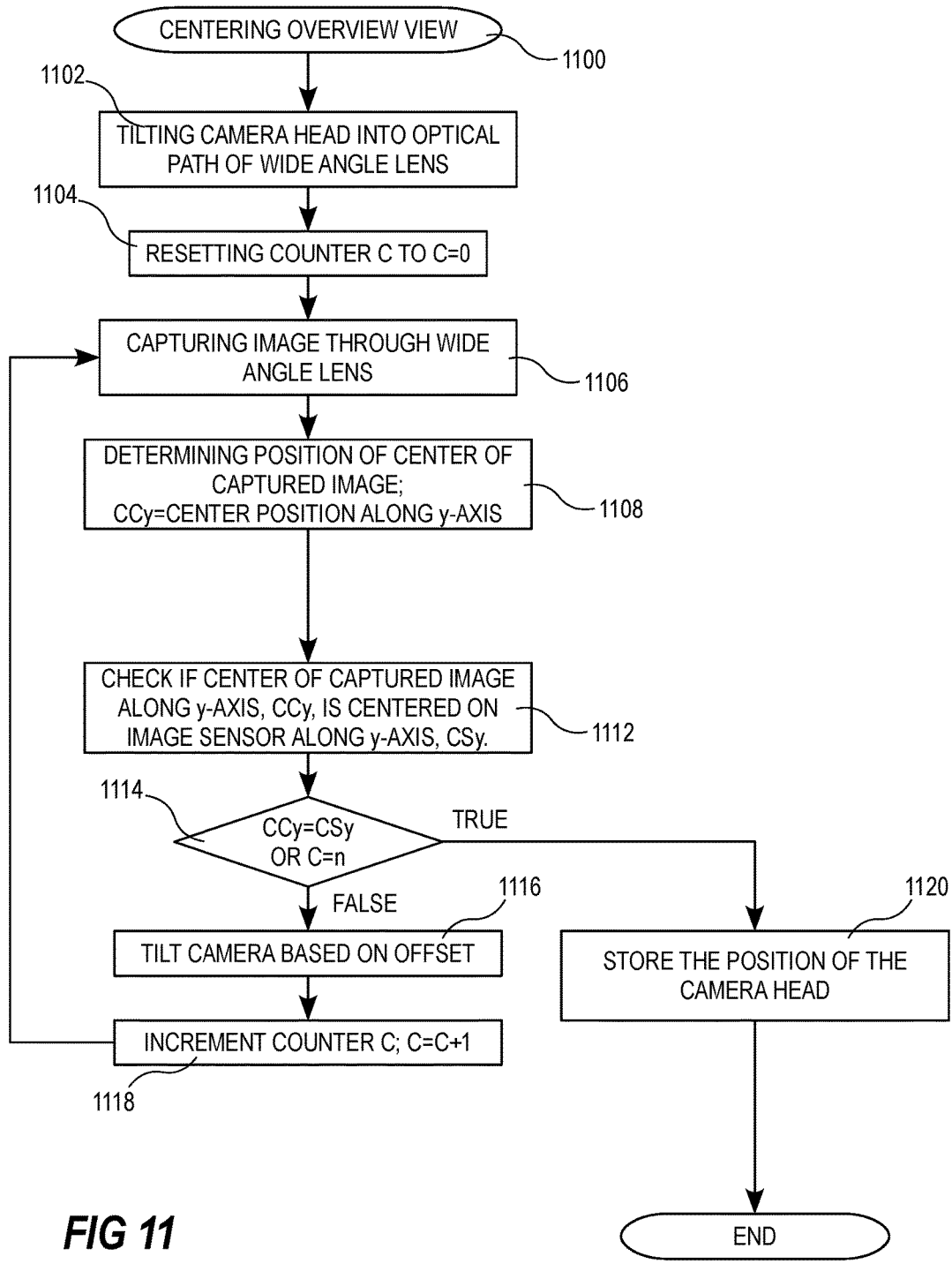
FIG. 11 is a flowchart showing a process of centering the projected overview image onto the image sensor.

As shown in FIG. 11, the process of calibrating the camera 10 in order to effectively utilize the image sensor by centering the overview is initiated, process 1100, and the camera head 12 is tilted into the optical path 22 of the wide angle lens 20, step 1102, and is thus positioned for capturing images in overview mode. Then a counter C is reset to e.g. zero, C=0, step 1104. The idea behind the counter is to count the number of times the repositioning procedure below has been performed in order to limit the number of times this procedure is performed. An image is captured through the wide angle lens, step 1106, and the position CCy of the center of the captured image is determined, step 1108. In this particular embodiment, the center position along the y-axis of the projected image is determined but not necessary the center position along the x-axis, because we only use the position along the y-axis for the adjustments. However, there may be specific embodiments in which the position along the x-axis is required as well as the position along the y-axis. One way of determining the center position is by using edge detection and a Standard Hough Transform arranged for finding parameters of a circle. The circle being represented by the edge of the image projection and the image projection being substantially circular if the camera is equipped with a lens generating circular images.

This center CCy of the projected image is then related to the center of the image censor CSy, also along the y-axis, and the process checks, step 1112, if the center CCy of the projected image along the y-axis is substantially centered on the image sensor, i.e., if CCy=CSy±tolerance. In step 1114, a determination is made as to if the center CCy of the projected image is determined to correspond to the center CSy of the image sensor in the y-direction, or if the counter C counting the number of times this check and repositioning of the camera head has been performed n times. According to one embodiment, the value of n is three. The value n defines how many times the repositioning and checking of the camera head is allowed to be performed. One reason for this parameter is to avoid that the system get stuck in a loop, such as for instance, if the system for some reason is not able to determine the center. Hence, the value of n may be any number as long as it is small enough not to result in a perception of deteriorated performance.

If the check in step 1114 is false, the camera head is tilted based on the offset of between the center CCy of the projected image along the y-axis and the center of the image sensor along the y-axis, step 1116. According to one embodiment, an angle $\alpha_{tilterr}$ that the camera head 12 is to be tilted is calculated based on equation 4 below:

$$\alpha_{tilterr} = \beta_{totch} \frac{e_y}{h}$$ Equation 4 where
 $\alpha_{tilterr}$: the angle that the camera head should be tilted
 $\beta_{totch}$: the total viewing angle from camera head alone
 $e_y$: distance from the center CSy of the image sensor to center of captured circular image CCy
 h: height of image sensor Then the counter C is incremented, step 1118, and the process is returned to step 1106 for capturing a new image at the new position of the camera head and for checking if the new position is more accurate.

If the check in step 1114 is true, then the position of the camera head is stored in memory in order to be used as the position to return the camera head to when entering overview mode, step 1120, i.e., the overview mode coordinates or angles are set for the camera head. Then, when the overview position for the camera head has been determined, the calibration process for positioning of the camera head in overview mode is concluded.

According to one embodiment, the center of the projected image is found using a Hough Transform and the projected image is substantially circular. Further information of the Hough Transform may be found in "Computer Vision", by Shapiro, Linda and Stockman, Prentice-Hall, Inc. 2001.

In order to apply the Hough Transform for finding the parameters of the circle represented by the image projection, the boundary of the image projection has to be determined. This may be performed using any standard edge detection algorithm. When the edge of the projected image has been detected, the Hough Transform is applied to the detected edge. The processing using the Hough Transform may be accelerated by defining a limited range of possible circle radiuses for the analysing by means of the Hough transform. This may be achieved as a result of it being possible to have a quite accurate idea of the size of the circle shaped image projection. In one particular embodiment, the radius used in the Hough transform is in the range of 0.25-0.35 times the width of the image sensor. For a system having a sensor that has a width of 1280 pixels, the radius is selected in the range of 320 pixels-448 pixels.

In order to speed up the process even more and still get reliable results the radius may be selected from the range of 0.2921875-0.3125 times the width of the image sensor in pixels. For a system having a sensor that has a width of 1280 pixels the radius may be selected in the range of 374 pixels-400 pixels.

The above process of centering the image projection on the images sensor may be part of a calibration scheme for decreasing the offset between a selected position in the overview image and the center position in the detailed image view, see discussion relating to FIG. 8*a-b*.

Figure 12:
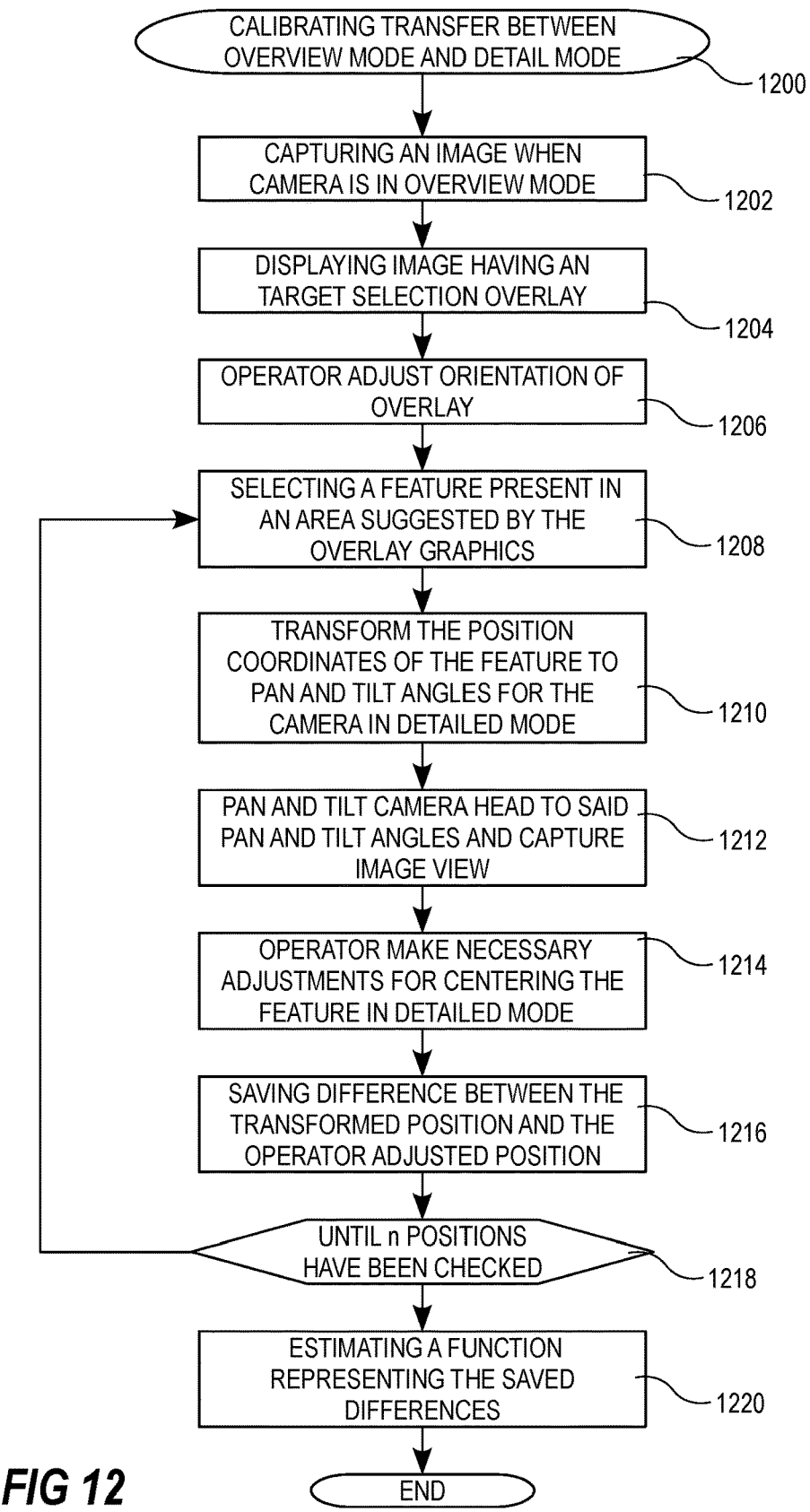
FIG. 12 is a flowchart showing a process of calibrating a transfer function from a position in an overview image to a pan and tilt position for a detailed view, FIG. 13 schematically depicts an overlay for facilitating selection of calibration positions that may be used in the process of FIG. 12, FIG. 14 schematically indicates a turning function of the overlay of FIG. 13.

A calibration scheme for decreasing the offset is described in the flowchart of FIG. 12. According to one embodiment a method 1200 for calibrating a pan tilt enabled camera may comprise acts described below. The process is initiated with the camera in overview mode and the process captures an overview image when camera is in overview mode, step 1202. The captured overview image is displayed and a pattern including indicators of at least three suggested selection areas is arranged as an overlay on the overview image, step 1204. The orientation of the overlay may then be adjusted by the operator in order to have as many distinguishing features as possible within a selection area indicated by the overlay, step 1206. The adjustment of the orientation of the overlay may include rotation of the overlay, e.g., around a center point of the image view, repositioning the suggested selection areas by uniformly moving them closer to or further away from the center point of the image view. This reposition operation and the rotation operation may be performed as a drag and drop operation on the overlay. Then, a point at a feature in one of the at least three suggested selection areas is selected, step 1208. The coordinates of the selected point is transformed into a pan angle and a tilt angle, step 1210.

Thereafter, the camera is panned and tilted in accordance with the pan angle and the tilt angle, entering the camera into detailed mode, and detailed image is captured when camera is in detailed mode after panning and tilting in accordance with the pan angle and the tilt angle is completed, step 1212.

In the system not calibrated for transition errors, the transition to detailed mode seldom results in the selected feature occurring in the center of the captured image in the detailed image view. The operator may manually adjust pan angle and tilt angle until the camera presents the point of the feature selected in the overview image substantially in the center of the image captured in detailed mode, step 1214. The camera is capturing images frequently during this panning and tilting in order to present the result of the panning and tilting to the operator. Information indicating the difference between the manually adjusted pan angle and tilt angle and the pan angle and the tilt angle resulting from the transforming of the position of the feature is now saved, step 1216, for later use. The steps of selecting features and registering the error in the transition from overview mode to detailed mode may then be repeated for at least two further selection areas, i.e. n=3 in step 1218. The value of n may be any number equal to or greater than three. The value of n should however not be too large, because then the calibration will be quite time consuming. In order to balance accuracy and speed the value of n may be in the range of 4-10.

When steps 1208-1216 have been performed n times, then the process estimates a function $f_{\Psi err}(\Psi_{calc})$, representing a pan error, in which $\Psi_{calc}$ is the pan angle directly transformed from the overview coordinates, and a function $f_{\varphi err}(\Psi_{calc})$, representing a tilt error, which also is depending on the pan angle $\Psi_{calc}$. These functions $f_{\Psi err}(\Psi_{cal})$ and $f_{\varphi calc}(\Psi_{calc})$ represent the errors based on the saved information, step 1220, and the calibration process is ended. The estimated function may now be used for compensating in transformations between positions in the overview mode and pan and tilt angles in detailed mode, i.e., the function may be applied on operations including transforming coordinates from the overview image to pan and tilt angles.

Figure 13:
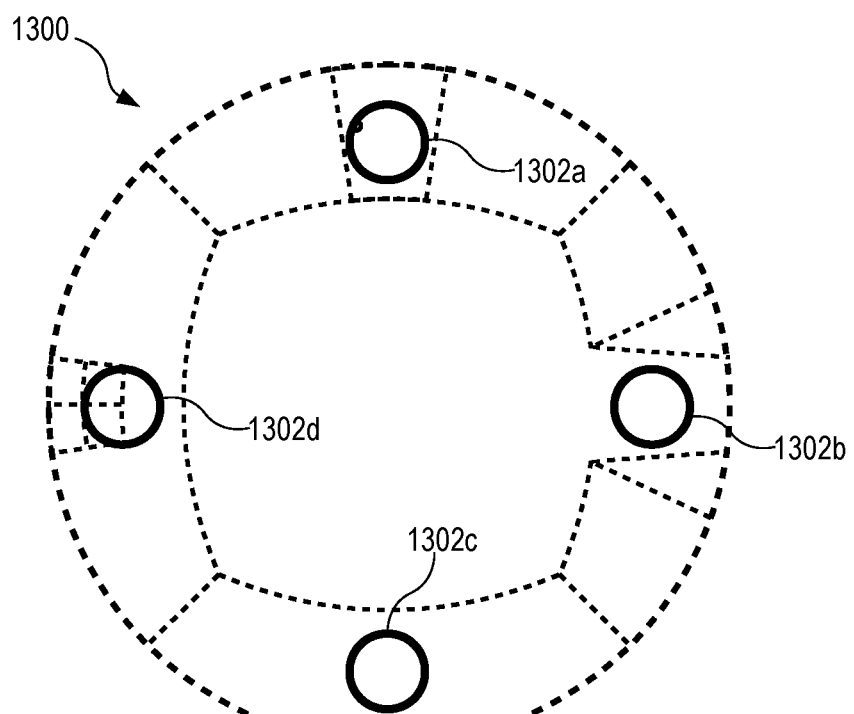
Figure 14:
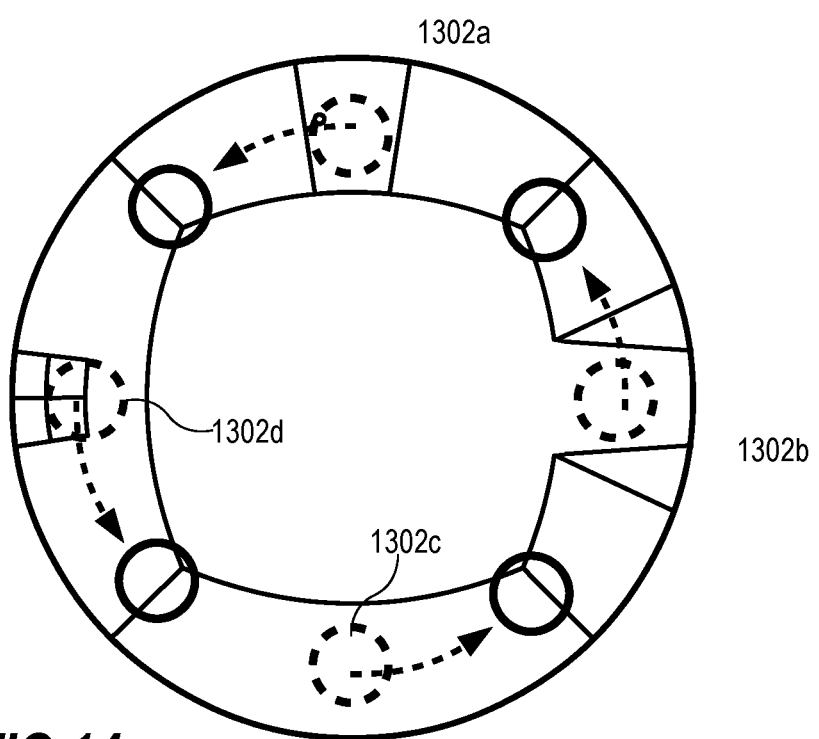

In FIG. 13, an example is shown of the overlay 1300 including indicators 1302a-d of suggested areas. The overlay is shown positioned in an overview image view, depicted with dashed lines, in order to indicate its relation to the overview image. The main function of the overlay is to support the operator performing the calibration by facilitate uniformly selection of calibration points. In order to further facilitate the identification of selected points when the camera is directed towards the selected point in detailed view, the overlay is rotatable, see FIG. 14. By enabling rotation of the overlay, it is possible for the operator to keep the uniform distribution of the selection areas while trying to fit easily identifiable features to select as calibration points. As seen in the overview image of FIG. 14, the indicators of suggested areas 1302a-d are rotated around the center point of the image view in real time in order to make it easy for the operator to see when features that are easily identifiable are present in all or at least in most of the indicators of suggested areas. The selection of calibration points that are uniformly distributed around the center point of the overview image makes the estimation of the error function more precise than if the points are positioned towards one side of the overview image. While four suggested selection areas 1302a-d are shown in FIGS. 13-14, as discussed above the number of selection areas may vary.

According to another embodiment, see FIG. 15 and FIGS. 16a-d, the process of selecting satisfactory points for use in calibration is performed by means of a dynamically adapting selection overlay. The process of this dynamic selection overlay comprises an initial presentation of an image 1300 captured in overview mode, step 1502, and then displaying this image 1300 and added thereon an overlay presenting a suggested selection area 1602a-d, step 1504. In FIGS. 16a-d, the image captured by the camera is shown as dashed lines in order to facilitate distinguishing between the overlay and the captured image in the figures. For the first selection, it is not necessary to present any suggested selection area because the following recommended selections will be based on the position in the overview image of the actual selection. The user may then select a specific calibration position 1604a-d within the presented overview image, step 1508. The selected calibration position is advantageously a position showing a clearly distinguishing feature for facilitating identification of the feature when in detailed mode. These position coordinates are then transformed to pan and tilt angles in accordance with Equations 1-3, step 1510, for use by the camera in detailed mode. Then, the camera head is panned and tilted to the pan and tilt angles in detailed mode and captures a detailed image view, step 1512. This detailed image view is studied by an operator who makes necessary adjustments for centering of the selected feature in the detailed view, step 1514. The difference between the transformed center position and the center position after adjustment by the operator is stored in memory for later use in estimating error functions, step 1516. Then the distribution in circumferential direction of selected positions is evaluated. This is performed by identifying an angle γ between radiuses from the center to two circumferentially adjacent selected positions. When only one position is selected the angle γ will be 360 degrees. The greatest angle $\gamma_{max}$ between adjacent selected positions is identified, step 1518. For the first selected position this angle is 360 degrees. If $\gamma_{max}$ is smaller than a predetermined threshold value $\gamma_{thresh}$, step 1520, then the process is deemed to have enough data to estimate error functions and the process ends by estimating the error function representing the saved differences, step 1522.

On the other hand, if $\gamma_{max}$ is not smaller than the predetermined threshold $\gamma_{thresh}$ value, step 1520, then a suggested selection area is positioned between, in circumferential direction, the two positions presenting the largest angle $\gamma_{max}$ between them. The new suggested selection area is positioned substantially at an angle of $\gamma_{max}/2$ from any one of the two adjacent positions. Then the process returns to step 1508 for selection of another calibration position.

Figure 15:
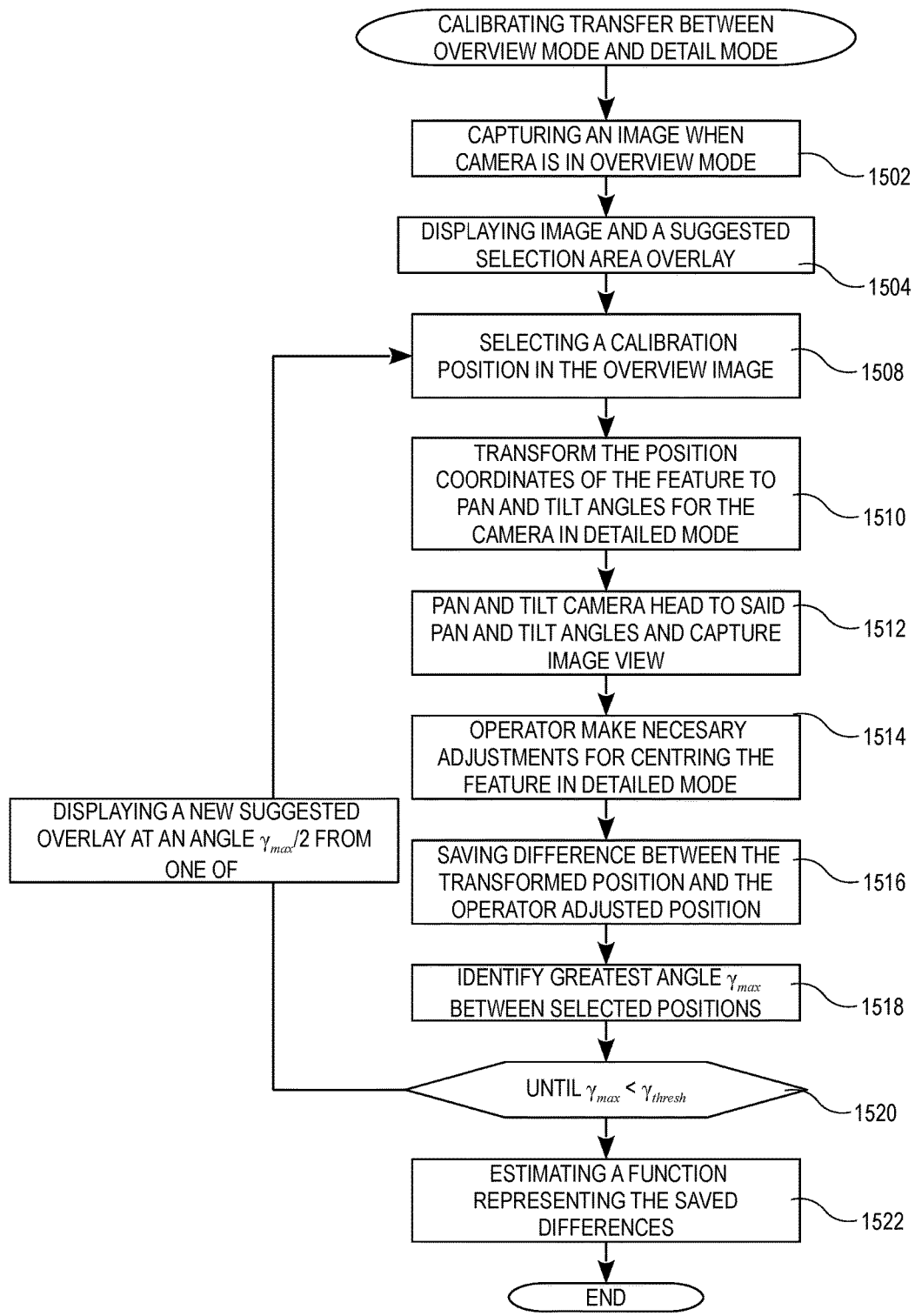
FIG. 15 is a flowchart is a flowchart showing an alternative process of calibrating a transfer function from a position in an overview image to a pan and tilt position for a detailed view.
Figure 16A:
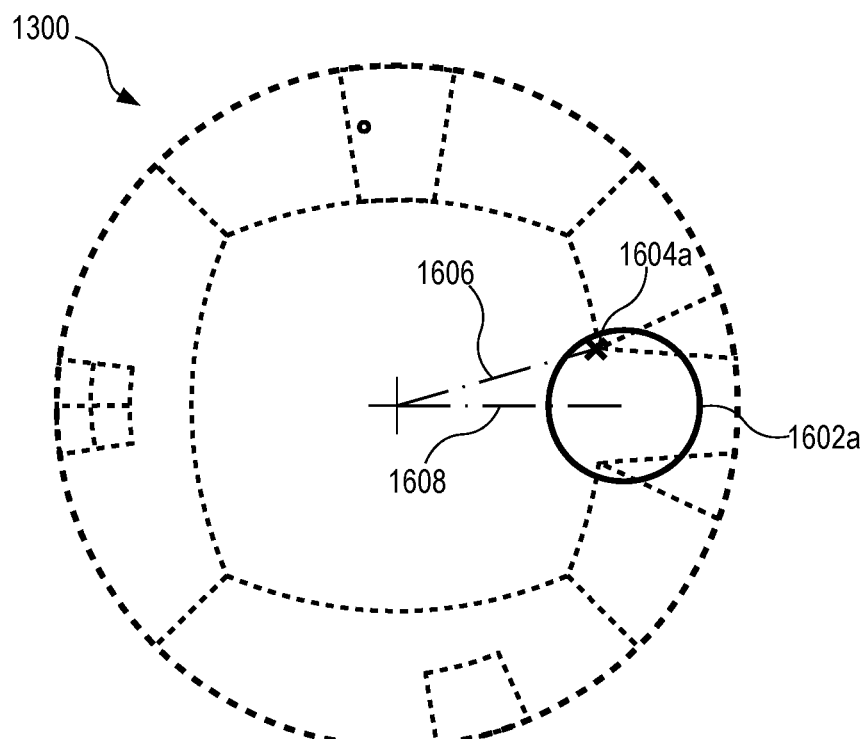
FIGS. 16a-d show the overview image and a selection overlay at different stages of the process described in connection with FIG. 15.
Figure 16B:
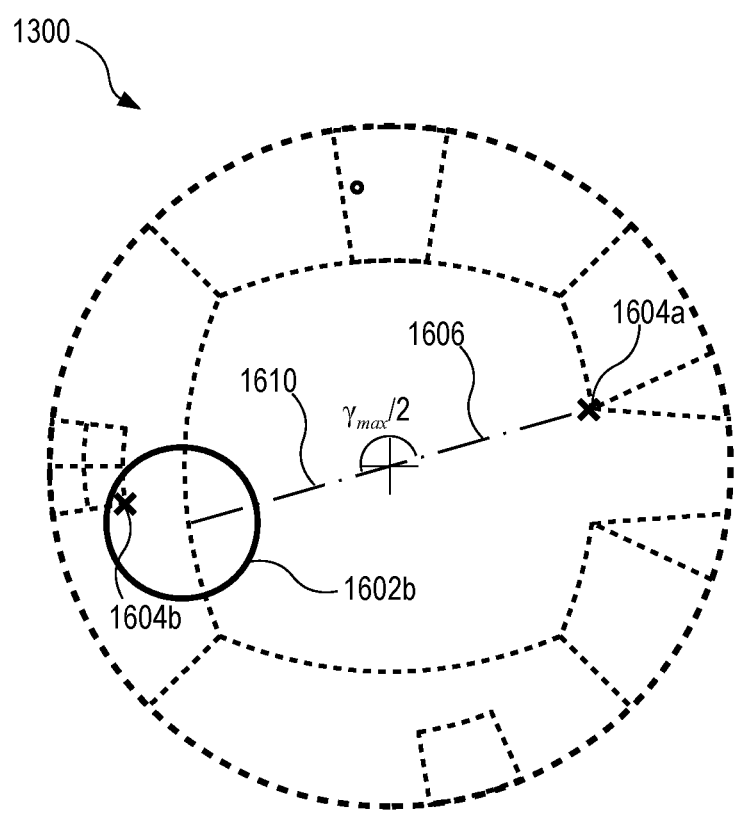

FIGS. 16a-d shows four consecutive selection loops relating to the process described in FIG. 15. FIG. 16a shows the initial suggested selection area 1602a and the initial selected calibration position 1604a selected in this first selection loop. Moreover, the largest angle $\gamma_{max}$ after this initial selection of a calibration position is 360 degrees. The lines 1606 and 1608 are only a helplines later used in order to facilitate the description of angles and, thus, these lines do not have to be included in the interface of an implementation of the invention. Then in FIG. 16b the selection view is shown when the selection process has returned for selection of a second calibration process and positioned a new suggested selection area 1602b at an angle $\gamma_{max}/2$ from the previously selected calibration position 1604*a*, see the angle between helplines 1606 and 1610. In this case the suggested selection area 1602*b* is positioned 180 degrees from the previous calibration position 1604*a* as there was only one previous selection position 1604*a*.

Figure 16C:
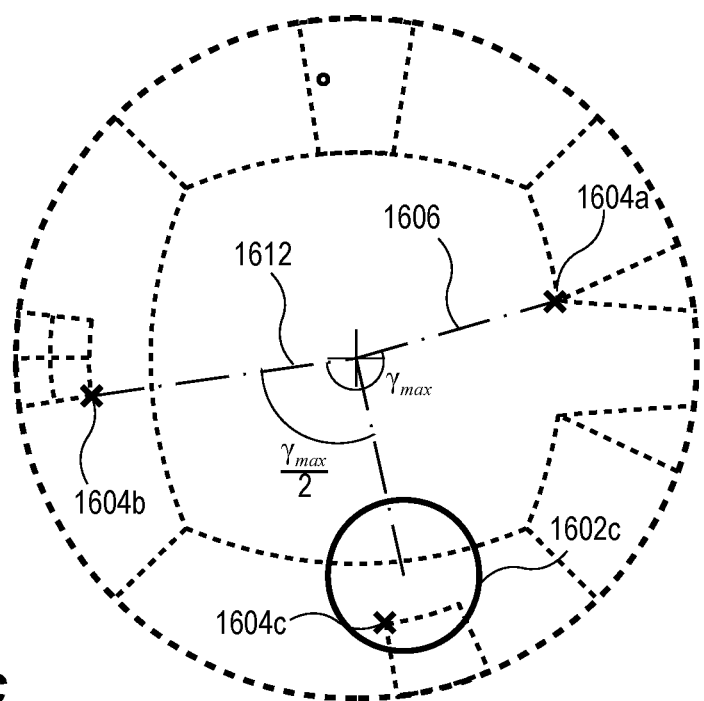
Figure 16D:
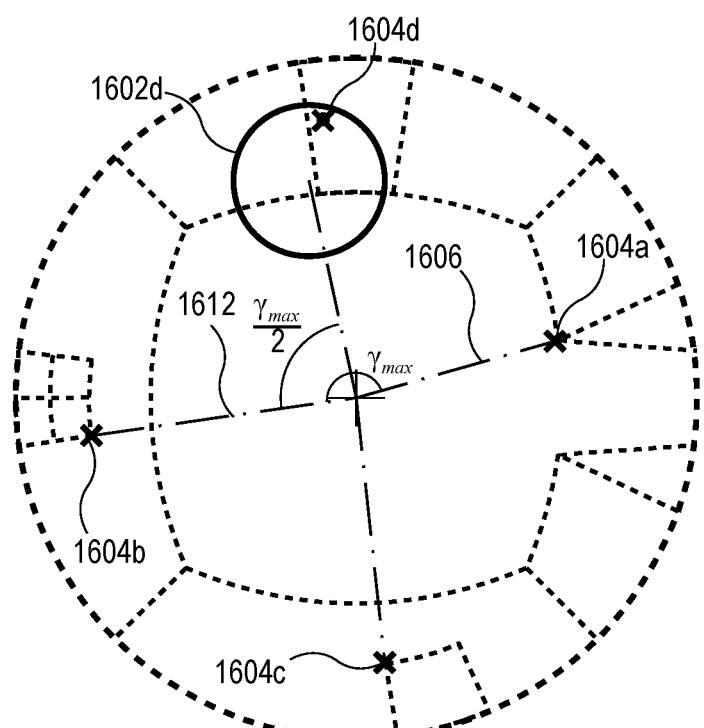

Then the operator may select a new calibration position 1604*b* over a suitable feature. It should be noted that the suggested selection areas 1602*a*-*d* are not necessary the only areas possible to select calibration positions within but rather indicates suitable areas for selecting calibration positions. After selection of the second calibration position 1604*b*, the selection process continues and eventually presents a new suggested selection area 1602*c* for the operator. The position of this new suggested selection area 1602*c* is once more calculated as half the angle $\gamma_{max}/2$ of the largest angle $\gamma_{max}$ between two circumferentially neighbouring selected calibration positions. In FIG. 16*c*, the largest angle $\gamma_{max}$ is found between the calibration positions 1604*a* and 1604*b* and is a fraction larger than 180 degrees and, thus, the suggested selection area 1602*c* is arranged substantially 90 degrees from any of the lines 1606 or 1612. A new calibration position 1604*c* is selected by the operator and the process loops once more.

The next suggested selection area 1602*d* is then positioned substantially at an angle marginally less than 90 degrees from the lines 1606 or 1612 forming the largest angle $\gamma_{max}$. The operator may then select the next calibration position 1604*d* and the process continues, unless this is the last calibration position to be recorded.

From the above discovered positional errors when directing the camera towards a calibration position, the error functions may be estimated. The error functions $f_{\Psi err}(\Psi_{calc})$ and $f_{\varphi err}(\Psi_{calc})$ may be estimated by a trigonometric function or a polynomial. The advantage of using a polynomial estimation is that a Linear Least Square Estimation (LLSE) may be used to find the coefficients of the functions. How to estimate a polynomial function using LLSE is well known to the person skilled in the art.

When the error functions has been estimated, an error estimation of the pan-tilt angle at any calculated pan-tilt position may be retrieved using the values produced by the transform from coordinates, x, y, to the pan tilt position $\Psi_{calc}, \varphi_{calc}$. Accordingly, the error in each pan-tilt position may be calculated according to Equations 5 and 6:

$$e_\Psi = f_\Psi(\Psi_{calc}) \qquad \text{Equation 5}$$

$$e_\varphi = f_{\varphi err}(\Psi_{calc}) \qquad \text{Equation 6}$$

Then, the error compensated pan-tilt position $\Psi$, $\varphi$ may be calculated according to Equations 7 and 8:

$$\Psi = \Psi_{calc} e_\Psi \qquad \text{Equation 7}$$

$$\varphi = \varphi_{calc} + e_\varphi \qquad \text{Equation 8}$$

The resulting pan-tilt position, i.e., the one determined by adjusting using the error function, is of substantially higher accuracy than a position calculated without using the error compensation.

Transformations from a pan-tilt position $\Psi$, $\varphi$ to an overview position x, y, may also be necessary. One case in which such transformation may be of interest is if an object in the detailed view has to be masked and the operator returns the camera to the overview mode. In this case the masked object should be masked in the overview mode as well as in the detailed mode. In order to achieve such result the position in the detailed mode has to be transformed to a position in the overview.

According to one embodiment, the transformation from pan-tilt positions $\Psi, \varphi$ to overview positions x,y, is based on equations inverting the transformation described in relation to Equations 1-3. According to one embodiment, the transformation includes calculating the distance d in the overview, see FIGS. 1*a*-*b* and Equation 9. The distance d is approximated as having the same relation to the radius of the overview image as the relation between tilt angle $\varphi$ and the total view angle $\theta$. When this distance d is calculated the dx and dy distances may be calculated using basic trigonometry, see Equation 10 and Equation 11, in which $\Psi$ is the pan angle.

$$d = \frac{\varphi}{\theta} r \qquad \text{Equation 9}$$

$$dx = d\sin\psi \qquad \text{Equation 10}$$

$$dy = -d\cos\psi \qquad \text{Equation 11}$$

In order to make true overview coordinates of the values of dx and dy the process further adjusts for the coordinates of the center point $x_c$, $y_c$, used as reference for the pan angle $\Psi$, for the distance d and for dx and dy. Moreover, in this transform, as well as in the transform for transformation from overview to detailed view, misalignment errors are present and therefore error functions for x and y, respectively, has to be determined. In one embodiment, these functions are estimated from substantially the same calibration process and data as described above. More specifically, the calibration process may be identical to any of the calibration processes described in connection with FIG. 12 or FIG. 15 with the addition of detecting and recording a position error in transformation to the overview coordinates using the identical calibration inputs already used in any of the processes described in FIG. 12 or 15 for the detection and recordation of the transformation error from an overview position to a pan-tilt position in a detailed view. According to one embodiment, the detection of the position error includes applying transformation equations to the pan-tilt position resulting from the operator's adjustments when aligning the center of the detailed view with the presently selected feature. The resulting coordinates in the Cartesian coordinate system of the overview, i.e., $x_t$, $y_t$, are then compared with the coordinates, x, y, from the original selection of the feature. These coordinates of the original selection are thus the true coordinates in the overview image of the feature that the operator adjusted to the center of the detailed view and these coordinates has already been registered. Hence, error values are simply calculated as $x_{error} = x_t - x$ and $y_{error} = y_t - y$, which are then stored for use in estimating error functions $f_x(\Psi)$, $f_y(\Psi)$, for the transformation from the detailed mode representation to the overview mode representation. The error functions may be estimated from the error data using the same methods as discussed above in relation to the estimation of the estimation of error functions for the transformation from overview mode to detailed mode. In one embodiment, the error functions $f_x(\Psi)$, $f_y(\Psi)$, have been estimated based on pan angle dependency not taking the tilt angle into account. In this embodiment, the tilt angle had substantially no effect on the error and therefore it was not necessary to consider the tilt-angle. The skilled person will appreciate that the error functions may be based on other variables, if a specific implementation so requires.

Hence, the error in the transformation operation for a calibrated system may be expressed as:

$$e_x = f_x(\Psi) \qquad \text{Equation 12}$$

$$e_y = f_y(\Psi) \qquad \text{Equation 13}$$

Accordingly the transformed and compensated coordinates in overview mode may be expressed as:

$$x = x_c + dx + e_x \qquad \text{Equation 14}$$

$$y = y_c + dy + e_y \qquad \text{Equation 15}$$

Figure 17:
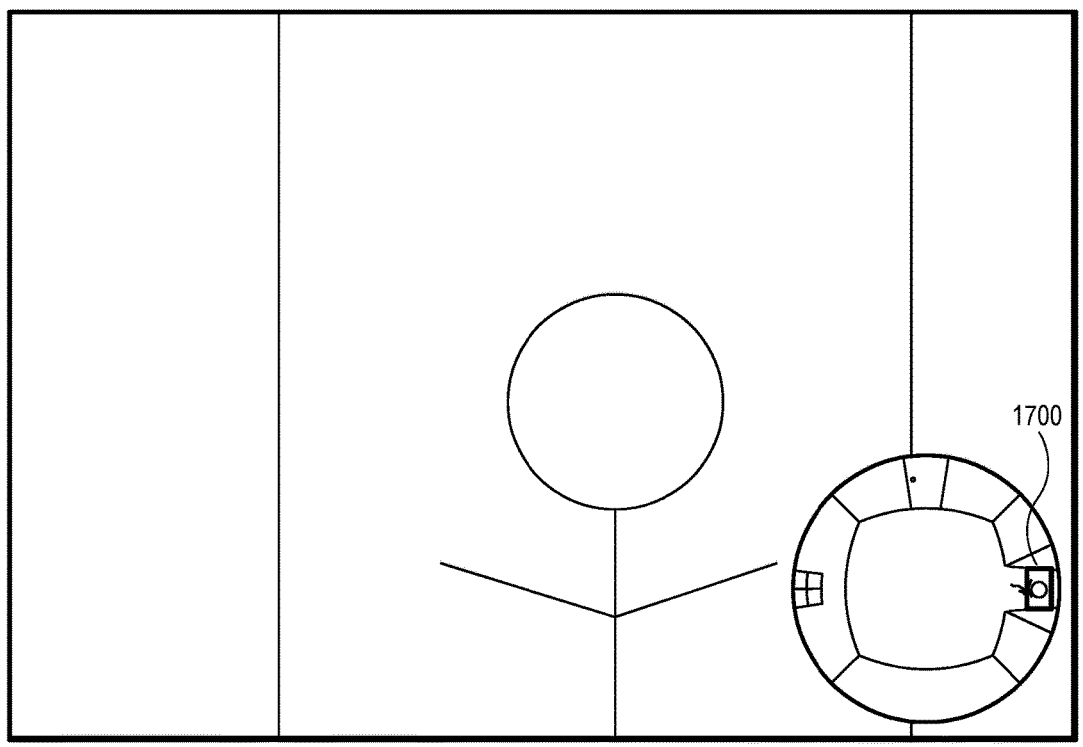
FIG. 17 shows a detailed view incorporating an overview image according to one embodiment of the invention.

As previously mentioned, this transformation from the detailed mode to the overview mode may be used in correctly positioning masks. For instance, masks for the pan-tilt cameras are often defined in pan-tilt angles and by introducing a more precise transformation method theses masks may simply be recalculated for the overview instead of being re-entered for the overview coordinates and thus facilitating the setting up of the monitoring camera. Another use of this transformation is that it enables improvements to the interface. For example, when the camera is in detailed mode, depicted in FIG. 17, a marker 1700 indicating the position of the detailed image view may be simultaneously displayed on the overview. In such an application, the overview may be displayed together with the detailed view in order to facilitate the understanding of the orientation of the camera. Accordingly, the position of the center point of the detailed view is continuously transformed into overview coordinates which are used for positioning the marker in the overview. The operator using this type of system may quickly identify where the monitoring camera is monitoring and may thus easily inform others about the whereabouts of specific activities. Providing a detailed view and an overview in the same operators view are not necessary restricted to use of a camera described in this application, but may also be used in a system using two separate cameras, one for the detailed view and another for the overview or in a system using a standard pan-tilt-zoom camera in combination with an overview image being stitched from a plurality of images captured by the camera. In the latter case the stitched overview image may be updated when new image information is available. Accordingly, the overview image may according to one embodiment be a static image when a detailed view is presented, but according to another embodiment the overview may be a live image even when the detailed view is presented live.

What is claimed is:

1. A method for calibrating offset between a selected position in an overview image and a center position in a detailed image, the overview image being captured by an overview camera and the detailed image being captured by a detailed view camera, these two cameras being different cameras, the method comprising:
   capturing the overview image by the overview camera;
   displaying the captured overview image with a predetermined overlay pattern that comprises a plurality of overlaid indicators, wherein each overlaid indicator represents a suggested selection area, to provide data for offset calibration; and
   for each suggested selection area:
      receiving a selection of a point in the suggested selection area at a feature in the overview image,
      transforming coordinates representing the point into a pan angle and a tilt angle for the detailed view camera to view a detailed view of the scene, the pan angle comprising an angle that the detailed view camera is panned with respect to a rotational axis of the detailed view camera, the tilt angle comprising an angle that the detailed view camera is tilted with respect to a tilt axis of the detailed view camera,
      panning and tilting the detailed view camera in accordance with the pan angle and the tilt angle,
      displaying a live detailed image captured using the detailed view camera after the detailed view camera has been panned and tilted in accordance with the pan angle and the tilt angle,
      while displaying the live detailed image adjusting the pan angle and the tilt angle, so that after adjusting the pan angle and the tilt angle, the feature is substantially in the center position of a detailed image captured by the detailed view camera to obtain an adjusted pan angle and an adjusted tilt angle, and
      storing information indicating a difference between the transformed pan and tilt angles and the adjusted pan and tilt angles as an offset value for calibrating offset between the selected position in the overview image and the center position in the live detailed image;
   wherein the method further comprises estimating functions associated with the stored offset values, the functions representing a pan error and a tilt error for the detailed view camera,
   wherein the steps of receiving, transforming, panning and tilting, displaying, adjusting, and storing are performed for each of the suggested selection areas.

2. The method of claim 1, further comprising adjusting orientation of the plurality of overlaid indicators in relation to the overview image.

3. The method according to claim 1, further comprising adjusting orientation of at least one of the plurality of overlaid indicators, in relation to the overview image by repositioning the at least one of the plurality of overlaid indicators by uniformly moving the at least one of the plurality of overlaid indicators closer to or further away from a center point of the overview image.

4. The method according to claim 2, wherein the step of adjusting orientation of the plurality of overlaid indicators is performed as a drag and drop operation on the overlay pattern.

5. The method according to claim 1, wherein the number of overlaid indicators is equal to or less than ten.

6. The method according to claim 1, wherein the number of indicators is equal to or higher than four.

7. The method according to claim 1, further comprising estimating the pan error function based on the pan angle transformed from the coordinates of selected points and the resulting offset and estimating the tilt error function based on the tilt angle transformed from the coordinates of the selected points and the resulting offset.

8. The method according to claim 2, wherein the step of adjusting orientation of the overlaid indicators includes rotation of the overlaid indicators around a center point of the overview image.

9. The method according to claim 3, wherein the step of adjusting orientation of the at least one of the plurality of overlaid indicators is performed as a drag and drop operation on the overlay pattern.

10. The method of claim 1, wherein the plurality of indicators that are uniformly distributed around a center point of the overview image.

* * * * *